Sept. 29, 1936.  J. B. GOODWIN  2,055,927
MAGAZINE FABRIC FILTER
Filed Nov. 7, 1933  2 Sheets-Sheet 1

INVENTOR:
John B. Goodwin,
BY
ATTORNEY.

Sept. 29, 1936.   J. B. GOODWIN   2,055,927
MAGAZINE FABRIC FILTER
Filed Nov. 7, 1933   2 Sheets-Sheet 2
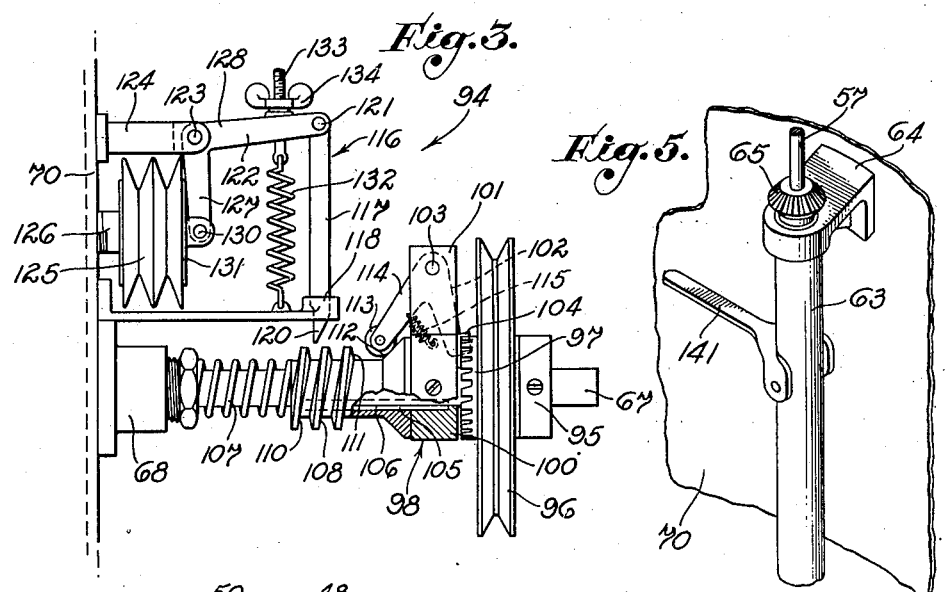
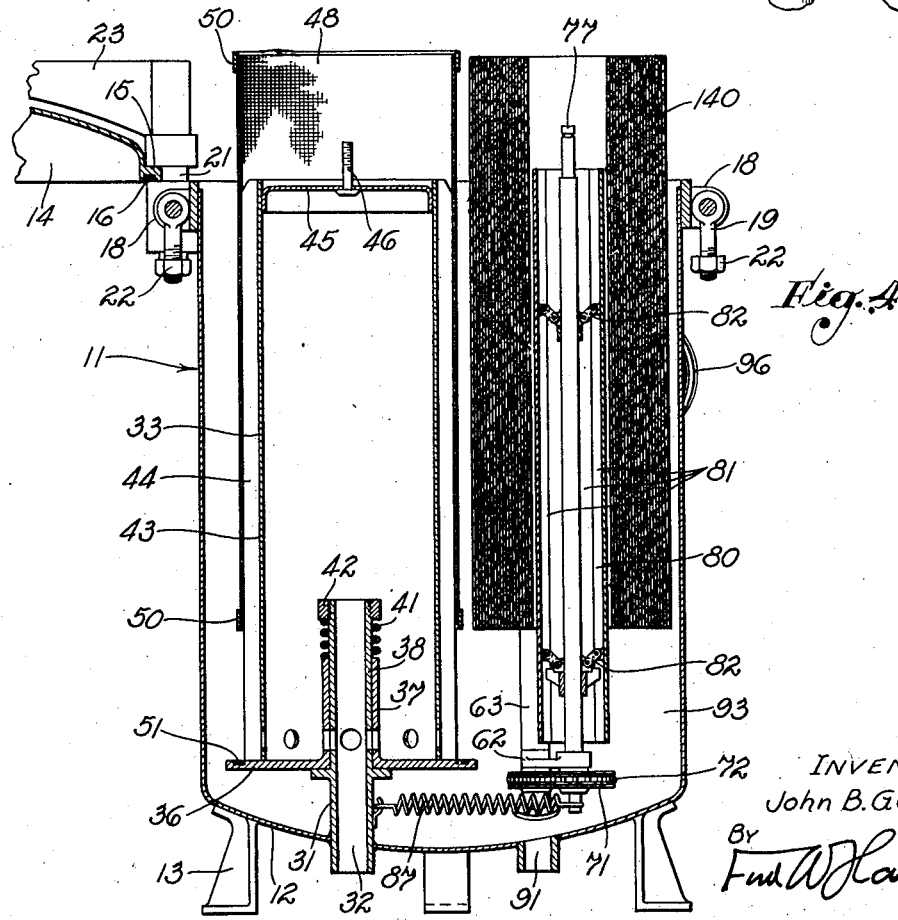
INVENTOR:
John B. Goodwin,
By
Fred W. Harris
ATTORNEY Patented Sept. 29, 1936

2,055,927

UNITED STATES PATENT OFFICE 2,055,927

MAGAZINE FABRIC FILTER

John B. Goodwin, Inglewood, Calif., assignor to F. W. Manning Co., Ltd., Los Angeles, Calif., a corporation of California Application November 7, 1933, Serial No. 696,968

23 Claims. (Cl. 210—177)

My invention relates to a device for filtering liquids for cleaning or purification thereof.

Filtration of liquids as at present performed consists in passing the liquid through a filter element of such character that solids carried by the liquid will be mechanically retained by the filter element. The filter element may be made with constituents therein having chemical reaction or absorbing characteristics for substances carried in the liquid so that the filtration will not be merely mechanical in its action but will produce a chemical purification of the liquid as well and may, as occasion may require, absorb coloring agents, etc., from the liquid. Accordingly, the hereinafter use of the word "filtering" or equivalent and similar terms relates not only to the mechanical separation of solids but also broadly to the practice of passing a liquid to be purified through a wall or body having desired characteristics. A filter element of the above character becomes clogged, as, for instance, by the accumulation on or in its surface portion of solid matter tending to restrict or prevent passage of fluid. Accordingly, in order to maintain reasonable efficiency in operation, the filter element must have its perviousness renewed at intervals.

It is an object of my invention to provide a filtering device having means which will operate automatically to renew the perviousness of the filter element under control of the fluid pressure existing within a specified part of the filtering device. In a filtering device the wall of filtering material divides the device into what may be termed an inlet chamber and an outlet chamber. As the clogging of the filter increases, the passage of fluid therethrough is gradually restricted so that pressure is built up in the inlet chamber or portion of the filtering device. In my invention I employ this increase in pressure to operate a means for renewing or restoring the perviousness of the wall of filtering material across the entire face thereof by causing the actuating mechanism to pass through a complete cycle of operation when its operation is once started as the result of an increase in pressure in the inlet chamber of the filtering device.

It is a further object of the invention to provide a filtering device in which the filter element is comprised of a wall of filtering fabric and in which the renewal of the perviousness of the filter element is accomplished by unrolling from the wall or roll a portion of the fabric. In the preferred practice of my invention the means for unrolling a portion of the fabric is so constructed that it will pass through a complete cycle of operation after it has been once started in order that a definite area of filter fabric will be removed from the roll constituting the filter element, instead of merely unrolling from the filter element an amount of fabric to renew a portion of the filter element just sufficient to produce a drop in pressure in the fluid within the inlet chamber of the filtering device.

A further object of the invention is to provide a filtering device having a simple and effective pressure responsive means for causing renewal of the perviousness of the filter element.

A further object of the invention is to provide a filtering device having a filter element in the form of a roll of filter fabric and a means for removing the filter fabric from the roll, which means is in pressural engagement with the surface of the roll so that during the unrolling operation rotation will be transmitted to the roll by friction aided by tension exerted on the filter fabric, thereby reducing to a minimum the possibility of breaking the fabric as the result of tension alone exerted in an attempt to unroll a portion of the fabric.

The filter fabric consists of a fiber material supported on a woven fabric such as scrim. The fiber, which when wet may be easily removed from the scrim, is held in place by the pressure of the fluid being filtered when the fabric is on the roll but readily separates from the scrim when the filter fabric is removed from the roll and during its passage to another roll. An object of the present invention is to provide a means for unrolling the filter fabric directly from the roll thereof onto a removal member so that there is no possibility of the fiber detaching itself from the scrim during the time it is passing from the roll to the removal member.

A further object of the invention is to provide a simple filtering device and one in which the filter element may be easily replaced.

Further objects and advantages of the invention will be made evident throughout the following part of the specification.

Referring to the drawings, which are for illustrative purposes only,

Fig. 3 is a fragmentary view showing the control means of the invention at the start of the operation of renewing the perviousness of the filter element of the filtering device.

Fig. 4 is a view of the general character of Fig. 2, showing the manner in which the filter element is removed from the filtering device and indicating the simplicity of replacing the filter element.

Fig. 5 is a fragmentary perspective view showing the latch means for holding the take-off roller of the device in retracted position.

Figure 1:
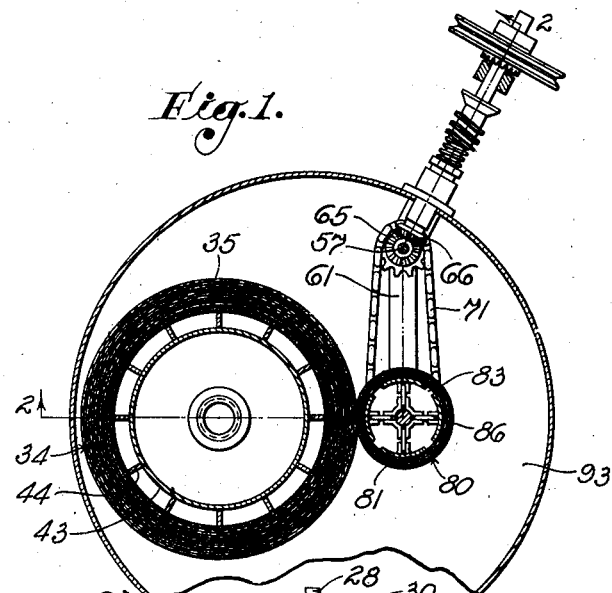
Fig. 1 is a horizontal cross section through a preferred embodiment of my invention, this cross section taken substantially on a plane represented by the line 1—1 of Fig. 2.

In the preferred form of the invention shown in the drawings, I employ a shell 11 which may be of cylindrical form and which is placed preferably in upright position. To the bottom wall 12 of the shell 11 supporting means 13 in the form of legs may be secured. The shell is provided with a detachable cover 14 having a flange 15 provided with a gasket 16 for engagement of a metal ring 17 forming the upper lip of the shell 11. The ring 17, for tightly securing the cover 14 in place, is preferably provided with a plurality of extending webs or brackets 18 to which eye-bolts 19 are pivotally secured so that they may be swung into engagement with notches 21 formed in the flange 15 of the cover, these eye-bolts 19 having nuts 22 thereon for tightly securing the cover 14 in place. To swingably support the cover 14 so that it may be readily swung to one side, I provide an arm 23 pivoted on a post 24 which extends through a boss 25 secured at one side of the upper portion of the shell 11, the swinging end 26 of the arm 23 having an opening 27 through which a screw 28 extends upwardly from the center of the cover 14. A threaded handwheel 30 operates on the upper portion of the screw 28 in a manner to lift the cover 14 into a free position so that by rotation of the arm 23 it may be carried into a position to one side of the shell 11, thereby permitting access to the interior of the shell through the upper open end thereof. Projecting upwardly from the bottom 12 is a tubular member 31 which forms an outlet passage 32 for the filtering device and also a support for a drum or carrier 33 for a tubular filter element 34 which preferably consists of a roll of sheet fabric 35. The drum 33 consists of a circular bottom plate 36 having bearing means in the form of an upwardly extending axial sleeve 37 fitting around the upper portion 38 of the tubular member 31 and resting upon a shoulder provided by a radial flange 40 formed immediately upon the tubular member 31. To prevent free rotation of the drum 33 on the tubular member 31, a spring 41 is compressed against the upper end of the sleeve 37 by means of a ring 42 threaded upon the upper end of the tubular member 31. In addition to the bottom plate 36, the drum 33 comprises a perforate cylindrical wall 43 of smaller diameter than the bottom plate 36 and having a plurality of radially extending ribs 44 for receiving the filter element 34. By means of a lateral wall 45 a screw 46 is carried in axial relation to the drum 33 and in such position that it will project through the center of a cover plate 47 forming the upper extremity of the drum 33. The filter element 34 comprises a cartridge adapted to be placed upon the drum in operative position, as shown, and preferably has a cylindrical supporting core 48 of a perforate material such as screen, this core 48 having cylindrical rings 50 mounted on the ends thereof so as to project from the ends of the filter element 34 and in position to be engaged by annular gaskets 51 and 52 carried in facing relation. When the cover plate 47 is removed, the filter element 34 may be readily dropped into place, whereupon the cover plate 47 may be tightened down against the upper projecting ring 50 by use of a nut 53 applied to the upper end of the screw 46, this nut having a projecting upper end portion 54 adapted to receive the leftward end of a spring 55.

Figure 2:
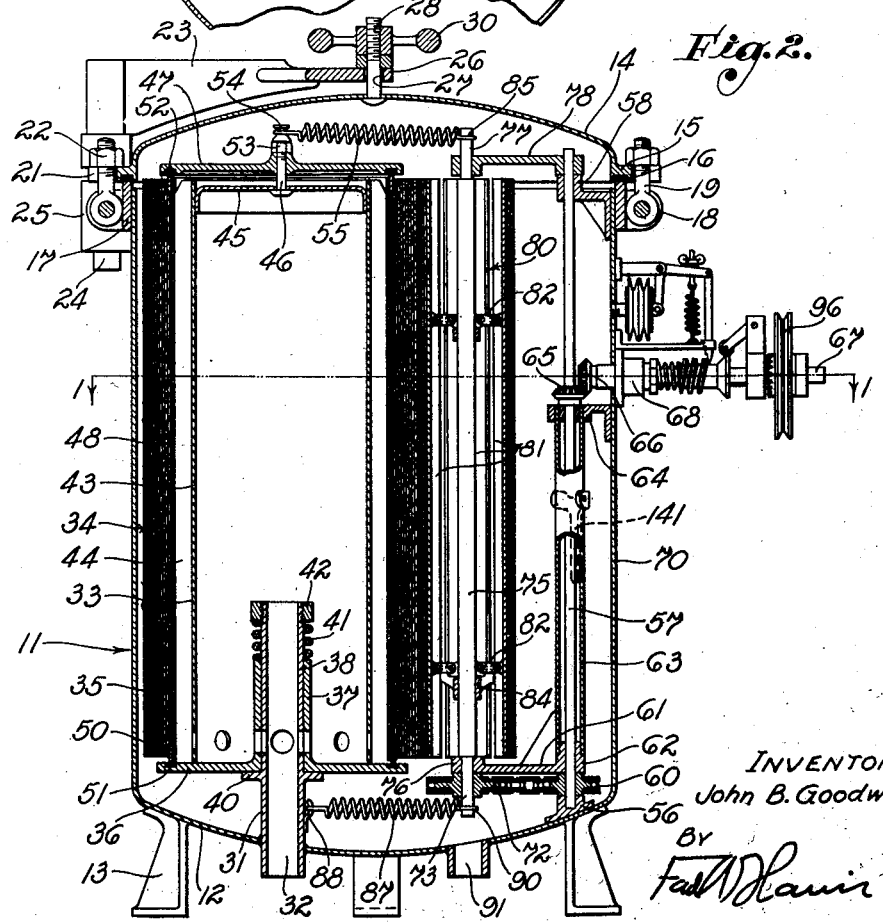
Fig. 2 is a vertical sectional view taken on the line 2—2 of Fig. 1.

Toward one side of the shell 11 a lower bearing member 56 supports the lower end of a shaft 57, the upper end of this shaft being supported by a bearing member 58 of bracket form which is disposed a short distance from the upper extremity of the shaft 57. To the lower end portion of the shaft 57 a drive means in the form of a sprocket 60 is secured, and above the sprocket 60 a lever or arm 61 is placed so as to rotate freely upon the shaft 57. Connected to the hub 62 of the lever 61 is a tube 63 which surrounds the shaft 57 and has its upper end carried in a bearing bracket 64. Keyed to the shaft 57 in a position above the upper end of the sleeve 63 is a bevel gear 65 which is engaged by a bevel gear 66 mounted on a shaft 67 which projects out through a bearing and packing means 68 mounted in the side or cylindrical wall 70 of the shell 11. Rotation of the shaft 67 is transmitted through the gears 66 and 65 and the shaft 57 to the sprocket 60 which is in turn connected by means of a chain 71 with a sprocket 72 mounted on the lower projecting end 73 of a shaft 75 supported in vertical relation by the outer end 76 of the lever 61. The upper end 77 of the shaft 75 may be turned down and is supported in parallel relation to the shaft 57 and the axis of rotation of the drum 33 by means of an upper lever or link 78 which is slipped down over the projecting upper end of the shaft 57 and the projecting end 77 of the shaft 75. The shaft 75 supports a fabric take-off spool 80 comprising a plurality of arcuate plates 81 of such shape as to form segments of a cylinder. These plates 81 are supported in concentric relation to the shaft 75 by means of radial links 82 which normally extend in radial planes, as shown in Fig. 2, but which may be swung upwardly into a diagonal position relative to the shaft 75 so as to reduce the effective diameter of the take-off spool 80 by moving the arcuate plates 81 inwardly relative to the shaft 75, there being narrow vertical spaces 83 between the adjacent edges of the plates 81 to permit such inward movement thereof. A collar 84 may be mounted on the shaft 75 below the lower set of links 82 in position to serve as a stop for the downward movement of the links 82 so that these links may not swing downwardly beyond the positions in which they are shown in Fig. 2.

The rightward end of the spring 55 engages a groove 85 in the upper extremity of the shaft 75 and exerts a force pulling the take-off spool toward the drum 33 for the purpose of holding the roll of fabric 86 on the take-off spool 80 tightly against the surface of the roll of fabric constituting the filter element 34. Complementary to the spring 55, a lower spring 87 is provided which is connected at 88 to the exterior of the tubular member 31 and at 90 to the lower extremity of the shaft 75. The lever arms 61 and 78 are of such length and the shaft 57 is so placed that the take-off spool 80 will swing through an arcuate path substantially tangential to a diametral plane passing through the axis of rotation of the filter element 34.

The fluid to be filtered enters the shell 11 through an inlet member 91 and passes through the layers of fabric 35 forming the filter element 34 into the interior of the drum 33 and then passes out through the tubular member 31, the pressure of the fluid against the filter element holding the fiber thereof in place. Although filter elements have their capacity renewed in various manners, for instance, as by carrying a scraper blade across the face of the filter element where such element is made of cloth or felt to remove the deposit of fine materials therefrom, I prefer in the practice of my present invention to renew the perviousness or capacity of the filter element by removing the outer layer of fabric, which is accomplished by rotating the take-off spool 80 and the winding of fabric 86 in engagement with the outer face of the filter element 34, the fabric passing directly from the roll constituting the filter element 34 onto the take-off spool 80 so that there is no possibility of fibers becoming detached from the fabric as the fabric passes from the filter element to the roll thereof formed on the take-off spool 80. As the clogging of the outer surface of the filter element 34 progresses, the speed of the fluid through the filtering device decreases until such time that essentially no flow of fluid takes place. At this time there will be a high pressure in the space 93 within the shell 11 around the exterior of the filter element 34 and a low pressure in the interior of the filter element 34. My invention provides means 94 employing this differential in pressure to cause rotation of the take-off spool 80. This actuating means 94 includes the shaft 67 which projects out through the packing means 68. Adjacent a collar 95 near the end of the shaft 67 a drive means in the form of a sheave or pulley 96 is mounted to rotate freely on the shaft 67, and the member 96 is provided with a clutch element 97 which may be of toothed or jaw character, as shown. To cooperate with the clutch element 97 the shaft 67 carries in fixed relation thereto a clutch element 98 comprising a collar 100 having a radial bracket 101 which supports an engager 102 by means of a pivot pin 103. The engager 102 has a lug or jaw portion 104 adapted to swing into engagement with the clutch element 97 of the drive element 96. The intermediate portion of the shaft 67 carries a spline 105 on which a cam member 106 is slidable axially of the shaft, this cam being normally urged in outward or rightward direction by means of a spring 107. The cam is provided with a spiral face 108, the leftward end 110 of which may be considered the primary portion of the cam and the rightward end 111 of which may be considered the secondary portion of the cam. On the cam is a diagonal face 112 adapted to engage a roller 113 carried on an arm 114 which projects from the engager 102. When the cam 106 is in leftward or secondary position, as shown in Fig. 2, the roller is held in outward position, and the engager 102 is held in a position of non-engagement with the clutch element 97. When the cam 106 moves rightwardly into the primary position in which it is shown in Fig. 3, the engager 102 is permitted to move into engagement with the clutch element 97 under force of a spring 115. Cooperating with the cam 106 I provide a control means 116 including a follower 117, the lower end of which is slidable through a guide 118 and which has a point 120 for engaging the spiral face 108 of the cam 106. The upper end of the bar 117 is secured by means of a pivot member 121 to one arm 122 of a bell-crank 128 which is fulcrumed at 123 to a bracket 124 carried on the wall 70 of the container 11 above an expansible metal bellows 125, the interior of which is connected through a nipple 126 with the space 93 of the shell 11. The remaining arm 127 of the bell-crank 128 is pivotally connected at 130 to the movable part 131 of the pressure responsive means 125. A spring 132, having an adjustment means in the form of a screw 133 and a wing nut 134, is applied to the bell-crank 128 so as to control the pressure required by fluid in the bellows 125 to force the engager 117 upwardly into a position such as shown in Fig. 3 of disengagement with the spiral face 108 of the cam 106.

The operation of the automatic control in connecting the drive means with the actuating mechanism including the shaft 67 is as follows. As the pressure in the space 93 builds up due to a reduction in the rate of flow of fluid through the filter element 34, the bellows 125 tends to expand against the action of the control spring 132. When the pressure within the shell 11 has become sufficient, the follower 117 will be moved outwardly into such position, as shown in Fig. 3, in which the cam 106 will be released so as to be then moved rightwardly by the spring 107 from the position in which it is shown in Fig. 2 to the position in which it is shown in Fig. 3, thereby causing engagement of the clutch means represented by the parts 97 and 102 so that rotation of the member 96 will be transmitted through the shaft 67 and other drive parts connected therewith to the take-off spool 80. The unrolling of the outer layer of sheet fabric 35 from the filter element 34 will be thus started, and as the unrolling action continues, an unclogged area of increasing size will be exposed adjacent the point of contact between the filter element 34 and the roll of fabric 86. Fluid may flow relatively rapidly through this unclogged area, and the pressure of fluid in the space 93 will be reduced to a point permitting collapsation of the element 125 before a very large amount of fabric has been unwound and likewise before a large unclogged area is exposed due to such unwinding action. The collapsation of the expansible member 125 will permit the follower 117 to move into engagement with the primary end of the spiral face 108, and as the cam 106 is rotated by the shaft 67 the follower 117 will move outwardly along the spiral face 108 toward the secondary end thereof, forcing the cam 106 leftwardly against the action of the spring 107 and causing the diagonal face 112 to gradually move the roller 113 radially outwardly so as to gradually retract the engager 102. When the secondary end 111 of the spiral face 108 is in conjunction with the point 120 of the follower 117, a complete disengagement of the clutch element will have been accomplished. But, to produce this disengagement of the clutch element has required a definite number of rotations of the shaft 67 and of the take-off spool 80 after the drop in pressure in the space 93, thereby assuring that a material amount of sheet fabric 35 will be removed each time the renewing mechanism of the device is operated, instead of the renewal operation stopping with the reduction in fluid pressure in the space 93.

When nearly all of the fabric 35 has been unrolled from the filter element 34 onto the take-off spool 80, removal of the spent fabric and replacement of the filter element may be quickly accomplished by removing the cover 14 from the shell 11, the member 47 from the drum 33, and the link or lever 78 from the upper end 77 of the shaft 75. The perforate core 48 may be then readily lifted from the drum 33, and by lifting on the roll 140 of spent fabric shown in Fig. 4, the arcuate plates 81 may be caused to swing upwardly on the links 82 so as to reduce the effective diameter of the take-off spool 80 and permit the roll 140 to slide freely therefrom. To hold the take-off spool in a retracted position during the placing of a new filter element on the drum 33, I provide a lever 141 pivotally secured to the tube 63 in such position that when the levers 61 and 78 are swung from the position indicated in Fig. 1 to a position adjacent the wall 70 of the shell 11, the lever or arm 141 may be rotated into a substantially horizontal position, as shown in Fig. 5, so as to engage the wall 70 and prevent the levers 61 and 78 and the take-off spool 80 from swinging toward the drum 33. After a fresh filter element has been placed on the drum 33, the lever or arm 141 may be lowered into the position in which it is shown in Fig. 2, whereupon the take-off spool 80 may be swung by the action of the spring 87 or of both springs 87 and 55 into cooperation with the outer surface of the new filter element. The outer end of the fabric sheet of a new filter element may be inserted in one of the vertical spaces 83 between adjacent plates 81, and the take-off spool 80 may then be given several turns in order that an operative connection of the outer end of the fabric with the take-off spool 80 may be accomplished.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A filtering device of the character described, including: means providing a path of flow for a fluid under pressure to be filtered; a filter element disposed in said path of flow and continuously subjected to the pressure of said fluid to be filtered; renewal means operative to renew the perviousness of said filter element with the release of fluid pressure from said filter element; actuating means operative in response to a predetermined change in pressure of said fluid to operate said renewal means; and sustaining means in connection with said actuating means for causing the same to pass through a complete cycle of operation when the operation thereof is once started.

2. A filtering device of the character described, including: means providing a path of flow for a fluid to be filtered; a filter element disposed in said path of flow; renewal means operative to renew the perviousness of said filter element; actuating means for said renewal means; a power drive for said actuating means; a clutch for connecting said actuating means with said power drive; control means operating in response to a predetermined change in pressure of said fluid to engage said clutch; and sustaining means for maintaining said clutch in engagement until said renewal means has been carried through a complete cycle of operation by said actuating means.

3. A filtering device of the character described, including: means providing a path of flow for a fluid under pressure to be filtered; a filter element disposed in said path of flow and continuously subjected to the pressure of said fluid to be filtered; renewal means operative to renew the perviousness of said filter element; actuating means for said renewal means; a power drive for said actuating means; a clutch for connecting said actuating means with said power drive; and control means operating in response to a predetermined change in pressure of said fluid to engage said clutch.

4. A filtering device of the character described, including: means providing a path of flow for a fluid to be filtered; a filter element disposed in said path of flow; renewal means operative to renew the perviousness of said filter element; actuating means operative in response to a predetermined change in pressure of said fluid to operate said renewal means; a cam connected to said actuating means so as to be moved through a cycle of operation; and sustaining means actuated by said cam and having connection with said actuating means to sustain the operation of said actuating means until said renewal means has passed through a prescribed cycle of operation.

5. A filtering device of the character described, including: means providing a path of flow for a fluid to be filtered; a filter element disposed in said path of flow; renewal means operative to renew the perviousness of said filter element; actuating means for said renewal means; a power drive for said actuating means; a clutch for connecting said actuating means with said power drive; control means operating in response to a predetermined change in pressure of said fluid to engage said clutch; and sustaining means for maintaining said clutch in engagement until said renewal means has been carried through a complete cycle of operation by said actuating means, said sustaining means comprising a movable part connected to said actuating means so as to be moved through a prescribed cycle of movement when said actuating means is operated, and a connection from said movable part to said clutch to hold said clutch in engagement until said renewal means has been carried through a complete cycle of operation by said actuating means.

6. A filtering device of the character described, including: means providing a path of flow for a fluid to be filtered; a filter element disposed in said path of flow; renewal means operative to renew the perviousness of said filter element; actuating means for said renewal means; said actuating means having a shaft member; a rotary cam connected to said shaft member so as to be rotated when said actuating means is operated; a follower for engaging said cam so as to move from a primary position to a secondary position relative to said cam; a drive means; a clutch connecting said drive means with said actuating means; means operative to disengage said clutch when said follower is in said secondary position, said clutch being engaged when said follower is out of said secondary position; and means operating in response to a predetermined change in pressure of said fluid to cause relative movement of said follower from said secondary position to said primary position, thereby causing engagement of said clutch and the operation of said actuating means through a definite cycle of operation determined by the movement of said follower from said primary position to said secondary position relative to said cam.

7. A filtering device of the character described, including: means providing a path of flow for a fluid to be filtered; a filter element disposed in said path of flow; renewal means operative to renew the perviousness of said filter element; actuating means for said renewal means; a cam connected to said actuating means so as to be moved when said actuating means is operated; a follower for engaging said cam so as to move from a primary position to a secondary position relative to said cam; a drive means; a clutch connecting said drive means with said actuating means; means operative to disengage said clutch when said follower is in said secondary position, said clutch being engaged when said follower is out of said secondary position; and means operating in response to a predetermined change in pressure of said fluid to cause relative movement of said follower from said secondary position to said primary position, thereby causing engagement of said clutch and the operation of said actuating means through a definite cycle of operation determined by the movement of said follower from said primary position to said secondary position relative to said cam.

8. A filtering device of the character described, including: means providing a path of flow for a fluid to be filtered; a filter element disposed in said path of flow; renewal means operative to renew the perviousness of said filter element; actuating means for said renewal means, said actuating means having a shaft member; a rotary cam connected to said shaft member so as to be rotated when said actuating means is operated; a follower for engaging said cam so as to move from a primary position to a secondary position relative to said cam, said cam being axially slidable on said shaft member from primary to secondary position as said follower moves relatively from primary position to secondary position; a drive means; a clutch connecting said drive means with said actuating means; means operative to disengage said clutch when said follower is in said secondary position, said clutch being engaged when said follower is out of said secondary position; and means operating in response to a predetermined change in pressure of said fluid to cause relative movement of said follower from said secondary position to said primary position, thereby causing engagement of said clutch and the operation of said actuating means through a definite cycle of operation determined by the movement of said follower from said primary position to said secondary position relative to said cam.

9. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element; actuating means operative in response to a predetermined change in pressure of said fluid to operate said renewal means; and sustaining means in connection with said actuating means for causing the same to pass through a complete cycle of operation when the operation thereof is once started.

10. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element; actuating means for said renewal means; a power drive for said actuating means; a clutch for connecting said actuating means with said power drive; control means operating in response to a predetermined change in pressure of said fluid to engage said clutch; and sustaining means for maintaining said clutch in engagement until said renewal means has been carried through a complete cycle of operation by said actuating means.

11. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element; actuating means operative in response to a predetermined change in pressure of said fluid to operate said renewal means; a cam connected to said actuating means so as to be moved through a cycle of operation; and sustaining means actuated by said cam and having connection with said actuating means to sustain the operation of said actuating means until said renewal means has passed through a prescribed cycle of operation.

12. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element; actuating means for said renewal means, said actuating means having a shaft member; a rotary cam connected to said shaft member so as to be rotated when said actuating means is operated; a follower for engaging said cam so as to move from a primary position to a secondary position relative to said cam; a drive means; a clutch connecting said drive means with said actuating means; means operative to disengage said clutch when said follower is in said secondary position, said clutch being engaged when said follower is out of said secondary position; and means operating in response to a predetermined change in pressure of said fluid to cause relative movement of said follower from said secondary position to said primary position, thereby causing engagement of said clutch and the operation of said actuating means through a definite cycle of operation determined by the movement of said follower from said primary position to said secondary position relative to said cam.

13. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element; actuating means for said renewal means, said actuating means having a shaft member; a rotary cam connected to said shaft member so as to be rotated when said actuating means is operated; a follower for engaging said cam so as to move from a primary position to a secondary position relative to said cam, said cam being axially slidable on said shaft member from primary to secondary position as said follower moves relatively from primary position to secondary position; a drive means; a clutch connecting said drive means with said actuating means; means operative to disengage said clutch when said follower is in said secondary position, said clutch being engaged when said follower is out of said secondary position; and means operating in response to a predetermined change in pressure of said fluid to cause relative movement of said follower from said secondary position to said primary position, thereby causing engagement of said clutch and the operation of said actuating means through a definite cycle of operation determined by the movement of said follower from said primary position to said secondary position relative to said cam.

14. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element, and means for urging said take-off roller toward said filter element so as to produce a frictional engagement for rotating said filter element; actuating means operative in response to a predetermined change in pressure of said fluid to operate said renewal means; and sustaining means in connection with said actuating means for causing the same to pass through a complete cycle of operation when the operation thereof is once started.

15. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element, and means for urging said take-off roller toward said filter element so as to produce a frictional engagement for rotating said filter element; actuating means for said renewal means; a power drive for said actuating means; a clutch for connecting said actuating means with said power drive; control means operating in response to a predetermined change in pressure of said fluid to engage said clutch; and sustaining means for maintaining said clutch in engagement until said renewal means has been carried through a complete cycle of operation by said actuating means.

16. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element, and means for urging said take-off roller toward said filter element so as to produce a frictional engagement for rotating said filter element; actuating means for said renewal means, said actuating means having a shaft member; a rotary cam connected to said shaft member so as to be rotated when said actuating means is operated; a follower for engaging said cam so as to move from a primary position to a secondary position relative to said cam, said cam being axially slidable on said shaft member from primary to secondary position as said follower moves relatively from primary position to secondary position; a drive means; a clutch connecting said drive means with said actuating means; means operative to disengage said clutch when said follower is in said secondary position, said clutch being engaged when said follower is out of said secondary position; and means operating in response to a predetermined change in pressure of said fluid to cause relative movement of said follower from said secondary position to said primary position, thereby causing engagement of said clutch and the operation of said actuating means through a definite cycle of operation determined by the movement of said follower from said primary position to said secondary position relative to said cam.

17. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element, and means for urging said take-off roller toward said filter element so as to produce a frictional engagement for rotating said filter element; and actuating means operative in response to a predetermined change in pressure of said fluid to operate said renewal means.

18. A filtering device of the character described, including: means providing a path of flow for a fluid to be filtered; a filter element disposed in said path of flow, said filter element comprising a roll of filter fabric; renewal means consisting of a take-off roller adapted to renew the perviousness of said filter element by unrolling said fabric from said filter element, and means for urging said take-off roller toward said filter element so as to produce a frictional engagement for rotating said filter element, there being means operative to hold said take-off roller in retracted position relative to said filter element; and actuating means operative in response to a predetermined change in pressure of said fluid to operate said renewal means.

19. In a filter, the combination of: a casing; a filter wall within the said casing comprising an annular roll of contiguous layers of filter fabric; an inlet communicating with the casing and an outlet communicating with the filter wall whereby a fluid may be passed through the said wall; a removal member attached to one end of the filter fabric; and means for rotating the annular roll and removal member in frictional contact with each other, whereby a portion of the filter fabric is removed from the annular roll and wound upon the removal member.

20. In a filter, the combination of: a casing; a filter wall within the said casing comprising an annular roll of contiguous layers of filter fabric; an inlet communicating with the casing and an outlet communicating with the filter wall whereby a fluid may be passed through the said wall; a removal member attached to one end of the filter fabric and in frictional contact with the annular roll; and means for rotating the removal member, whereby the frictional contact and pull of the removal member causes the annular roll to rotate and a portion of the filter fabric to be removed from the annular roll and wound upon the removal member.

21. In a filter, the combination of: a filter wall comprising an annular roll of contiguous layers of filter fabric; a removal member attached to one end of the filter fabric and in frictional contact with the annular roll; means for passing a fluid to be filtered through the said filter wall under a filter differential pressure; and means for rotating the removal member when the differential pressure has varied a predetermined amount, whereby the frictional contact and pull of the removal member causes the annular roll to rotate and a portion of the filter fabric to be removed from the annular roll and wound upon the removal member.

22. In a filter, the combination of: a casing; a filter wall within the said casing comprising an annular roll of contiguous layers of filter fabric; an inlet communicating with the casing and an outlet communicating with the filter wall whereby a fluid may be passed through the said wall; a removal member attached to the outer end of the filter fabric and arranged exteriorly of and in frictional contact with the annular roll; and means for rotating the removal member, whereby the frictional contact and pull of the removal member causes the annular roll to rotate and a portion of the filter fabric to be removed from the annular roll and wound upon the removal member.

23. In a filter, the combination of: a casing; a filter wall within the said casing comprising an annular roll of contiguous layers of filter fabric; an inlet communicating with the casing and an outlet communicating with the filter wall whereby a fluid may be passed through the said wall; a removal member attached to one end of the filter fabric; and means for rotating the removal member in contact with the annular roll, whereby a portion of the filter fabric is removed from the annular roll and wound upon the removal member.

JOHN B. GOODWIN.